US012602746B2

(12) United States Patent
Hassbring et al.

(10) Patent No.: US 12,602,746 B2
(45) Date of Patent: Apr. 14, 2026

(54) SYSTEM AND METHOD FOR BACKGROUND MODELLING FOR A VIDEO STREAM

(71) Applicant: Axis AB, Lund (SE)

(72) Inventors: Ludvig Hassbring, Lund (SE); Song Yuan, Lund (SE)

(73) Assignee: AXIS AB, Lund (SE)

( * ) Notice: Subject to any disclaimer, the term of this patent is extended or adjusted under 35 U.S.C. 154(b) by 160 days.

(21) Appl. No.: 18/678,551

(22) Filed: May 30, 2024

(65) Prior Publication Data

US 2024/0404014 A1 Dec. 5, 2024

(30) Foreign Application Priority Data

Jun. 5, 2023 (EP) ..................................... 23177277

(51) Int. Cl.
G06T 5/50 (2006.01)
G06T 7/194 (2017.01)
(Continued)

(52) U.S. Cl.
CPC ................ G06T 5/50 (2013.01); G06T 7/194 (2017.01); G06T 7/20 (2013.01); G06V 10/762 (2022.01);
(Continued)

(58) Field of Classification Search
CPC .. G06T 5/50; G06T 7/194; G06T 7/20; G06T 2207/20221; G06T 7/254;
(Continued)

(56) References Cited

U.S. PATENT DOCUMENTS 9,183,716 B2 11/2015 Connell, II et al.
2004/0151342 A1 8/2004 Venetianer et al.
(Continued)

FOREIGN PATENT DOCUMENTS

KR 20110124441 A 11/2011
KR 101731243 B1 * 4/2017 ............... H04N 7/18

OTHER PUBLICATIONS

Lim, L., et al., "Learning Multi-Scale Features for Foreground Segmentation", Article, Ankara University, Turkey, (2019).
(Continued)

*Primary Examiner* — Sarah Lhymn
(74) *Attorney, Agent, or Firm* — Volpe Koenig

(57) ABSTRACT

The present disclosure relates to a method of background modelling for a video stream acquired by a camera having movement capabilities. The method comprises: acquiring a video stream; repeatedly updating a background model for the video stream by analyzing changes in the sequence of image frames and categorizing image areas in the image frames which do not change over time as background; detecting camera movement; performing a reset of the background model by: applying an image segmentation and/or object detection algorithm to identify at least foreground objects; after having performed the reset of the background model, returning to repeatedly updating the background model for the video stream by analyzing changes in the sequence of image frames and categorizing image areas in the image frames which do not change over time as background. The disclosure further relates to an image processing system.

12 Claims, 7 Drawing Sheets

(51) Int. Cl.

| | | |
|---|---|---|
| *G06T 7/20* | (2017.01) | |
| *G06V 10/762* | (2022.01) | |
| *H04N 5/272* | (2006.01) | |

(52) U.S. Cl.
CPC ... *H04N 5/272* (2013.01); *G06T 2207/20221* (2013.01); *G06V 2201/07* (2022.01)

(58) Field of Classification Search
CPC . G06T 2207/10016; G06T 2207/20081; G06T 2207/20084; G06T 7/215; G06T 7/246; G06T 7/11; G06V 10/255; G06V 20/52; G06V 20/41; G06V 20/46; G06V 20/49; H04N 5/144; H04N 5/147
See application file for complete search history.

(56) References Cited

U.S. PATENT DOCUMENTS

| | | | |
|---|---|---|---|
| 2005/0104964 A1 | 5/2005 | Bovyrin et al. | |
| 2008/0152236 A1 | 6/2008 | Vendrig et al. | |
| 2009/0041359 A1* | 2/2009 | Park | G06V 20/52 |
| | | | 382/199 |
| 2010/0201820 A1* | 8/2010 | Lopota | G08B 13/1961 |
| | | | 348/152 |
| 2011/0142283 A1* | 6/2011 | Huang | G06T 7/254 |
| | | | 382/103 |
| 2012/0106837 A1 | 5/2012 | Partis et al. | |
| 2015/0317800 A1 | 11/2015 | Wang et al. | |
| 2016/0037182 A1* | 2/2016 | Kadono | H04N 19/61 |
| | | | 375/240.13 |
| 2017/0278289 A1* | 9/2017 | Marino | G06T 7/536 |
| 2019/0019031 A1 | 1/2019 | Yun et al. | |
| 2023/0338852 A1* | 10/2023 | Bae | A63F 13/67 |

OTHER PUBLICATIONS

Viola, P., et al., "Rapid object detection using a boosted cascade of simple features", Proceedings of the 2001 IEEE Computer Society Conference on Computer Vision and Pattern Recognition. CVPR 2001, Kauai, HI, USA, (2001).

Long Ang Lim et al: "Learning Multi-scale Features for Foreground Segmentation", arxiv.org, Cornell University Library, 201 Olin Library Cornell University Ithaca, NY 14853 Aug. 4, 2018, XP080904966.

Yun Kimin et al: "Unsupervised Moving Object Detection through Background Models for PTZ Camera", 2020 25th International Conference on Pattern Recognition (ICPR), IEEE, Jan. 10, 2021 pp. 3201-3208, XP033909355.

Kim Jae-Yeul et al.: "Visual Surveillance using Background Model Image Generated by GAN", 2020 20th International Conference on Control, Automation and Systems (ICCAS), Institute of Control, Robotics, and Systems—ICROS, Oct. 13, 2020, pp. 292-295, XP033867295.

* cited by examiner

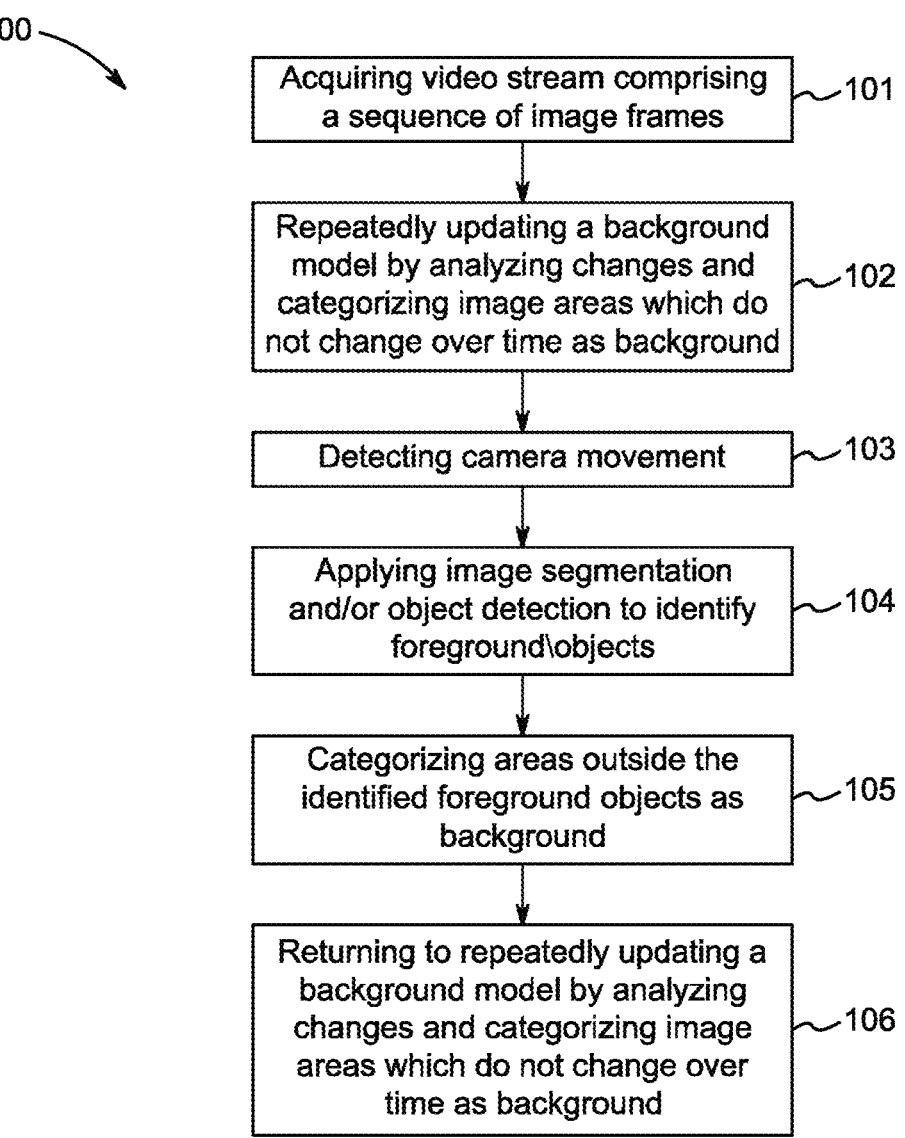

100

Acquiring video stream comprising a sequence of image frames ~101

Repeatedly updating a background model by analyzing changes and categorizing image areas which do not change over time as background ~102

Detecting camera movement ~103

Applying image segmentation and/or object detection to identify foreground\objects ~104

Categorizing areas outside the identified foreground objects as background ~105

Returning to repeatedly updating a background model by analyzing changes and categorizing image areas which do not change over time as background ~106

SYSTEM AND METHOD FOR BACKGROUND MODELLING FOR A VIDEO STREAM

FIELD OF INVENTION

The present disclosure relates to a method of background modelling for a video stream acquired by a camera having movement capabilities. The disclosure further relates to an image processing system, which implements the method.

TECHNICAL BACKGROUND

Video processing is a particular case of signal processing. Video processing uses hardware, software or a combination for processing a sequence of images representing a video. In video processing a number of processing tasks require preprocessing. One commonly applied step in such a process is defining and applying a background model to a video sequence. The background modelling can be said to divide the image frames into parts or areas that are either categorized as background or as foreground. The resulting split into background and foreground may allow further video processing to focus on the parts of the image frames that are relevant for certain processing tasks. Some processing tasks may, for example, only be necessary to perform for the foreground while other processing tasks are only relevant to perform for the background.

One type of background modelling is based on analysis of motion in the video stream. If a part of the image does not change significantly, it can be considered to belong to the background. Such background modelling is an affordable and efficient way of offering a background model that is useful for a number of applications. It can be used in, for example, background overlay applications and dynamic privacy masking applications. For fixed cameras the conventional background modelling based on motion in the video stream used with, for example, a configurable background merge time, can generally be considered to be a solution that works reasonably well.

For cameras having movement capabilities, such as Pan Tilt Zoom (PTZ) cameras, the background modelling is, however, typically more challenging. A PTZ camera is a camera that is capable of directional and zoom control. Since such cameras can move with fast changes in the scene, the conventional background modelling may have challenges in identifying the background and foreground in the video stream correctly by analyzing changes since the background modelling based on analysis of motion cannot distinguish between changes caused by the movement of the camera and changes caused by objects moving in the scene. Consequently, when using such modelling there is a risk that some or all parts of the scene that do not move are incorrectly categorized as foreground when the camera moves.

In addition to the mentioned challenge with background modelling for cameras having movement capabilities, there are typically other requirements or limitations present for such cameras. For example, there may only be limited processing power, in particular when there is camera movement, which make possible alternatives impossible or ill-suited. There is thus a need for improvements of background modelling for video streams acquired by cameras with movement capabilities.

SUMMARY

The present disclosure relates to a method of background modelling for a video stream acquired by a camera having movement capabilities, the method comprising:

acquiring a video stream comprising a sequence of image frames;

repeatedly updating a background model for the video stream by analyzing changes in the sequence of image frames and categorizing image areas in the image frames which do not change over time as background;

detecting camera movement, and, optionally, stopping repeatedly updating the background model;

upon detecting a camera movement stop or the camera movement going below a movement threshold, performing a reset of the background model by:

acquiring one or more image frames;

applying an image segmentation and/or object detection algorithm on the one or more image frames to identify at least foreground objects;

categorizing areas outside the identified foreground objects as background;

after having performed the reset of the background model, returning to repeatedly updating the background model for the video stream by analyzing changes in the sequence of image frames and categorizing image areas in the image frames which do not change over time as background.

The inventors have realized that by combining two ways of modelling the background for a camera having movement capabilities as described, a robust and power efficient background modelling can be achieved. By using a quick reset of the background model when the camera stops moving, the background modelling can quickly get a valid background and start further processing of the image frames, which need the background model. Preferably, the step of repeatedly updating a background model by analyzing changes in the sequence of image frames and categorizing image areas in the image frames which do not change over time as background is a continuous process, whereas the reset of the background model is a single event. The image segmentation and/or object detection algorithm that is used for performing the reset of the background model may typically involve the use of a neural network or other suitable artificial intelligence (AI) based method. While AI based methods are good at determining background and foreground objects, these methods may also require more processing power. In the example of a moving PTZ camera, the motor can cause significant power peaks during movement. Also when the camera does not move there are typically also power limitations depending on how the camera is powered.

The inventors have found a hybrid solution that can address the aforementioned challenges. In this solution a background model for a video stream is repeatedly updated using a conventional modelling as long as there is no or limited movement, whereas a quick reset using an image segmentation and/or object detection algorithm is performed upon a camera stop.

During the quick movement there are several options available. One is to stop maintaining the background model during the quick movement. In case of an application involving, for example, static background overlay where a static position-based overlay is applied to only background areas and not foreground areas, it is possible to make the overlay visible unconditionally, i.e., for both background and foreground. In case of dynamic masking, it is possible to apply full screen masking temporarily during the quick movement. As soon as the camera stops, the single quick reset of the background can be performed to quickly get a background again.

The present disclosure further relates to an image processing system comprising:

at least one camera, such as a pan-tilt-zoom camera; and a processing unit configured to:

acquire a video stream comprising a sequence of image frames;

repeatedly update a background model for the video stream by analyzing changes in the sequence of image frames and categorizing image areas in the image frames which do not change over time as background;

detect camera movement, and, optionally, stop repeatedly updating the background model;

upon detecting a camera movement stop or the camera movement going below a movement threshold, perform a reset of the background model by:

acquiring one or more image frames;

applying an image segmentation and/or object detection algorithm on the one or more image frames to identify foreground objects;

categorizing areas outside the identified foreground objects as background;

after having performed the reset of the background model, return to repeatedly updating the background model for the video stream by analyzing changes in the sequence of image frames and categorizing image areas in the image frames which do not change over time as background.

The system may further comprise a display for displaying the sequence of image frames of the video stream. Typically, further processing, such as dynamic privacy masking, overlaying or any kind of image/video processing will also be applied in the video stream that is displayed. Dynamic privacy masking may include masking one or more foreground areas, i.e. moving objects of the scene. In contrast, static privacy masking is a position-fixed mask, for example masking of user-defined image areas in the scene. Position-fixed masks may be used for masking, e.g., windows of a building. The term 'overlay' refers to content or information added, usually superimposed on the image frames. An overlay may be restricted to cover only background areas. The content or information of an overlay can include, but is not limited to, text, images, symbols, graphics, graphs, statistics, boxes etc. The image processing system may be used in, for example, a camera-based surveillance system.

A person skilled in the art will recognize that the presently disclosed method of background modelling for a video stream acquired by a camera having movement capabilities may be performed using any embodiment of the presently disclosed image processing system, and vice versa.

BRIEF DESCRIPTION OF DRAWINGS

Various embodiments are described hereinafter with reference to the drawings. The drawings are examples of embodiments and are intended to illustrate some of the features of the presently disclosed method and system for background modelling for a video stream, and are not limiting to the presently disclosed method and system.

FIG. 1. shows a flow chart of a method according to an embodiment of the presently disclosed method of background modelling for a video stream.

DETAILED DESCRIPTION

Figure 2A:
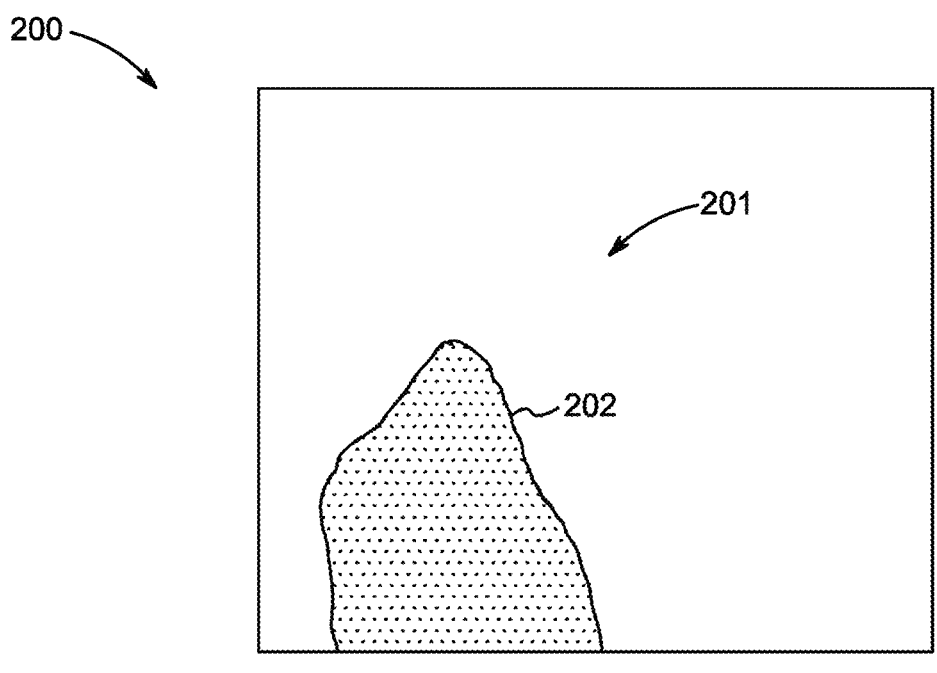
FIGS. 2A-2B are schematic illustrations of an image frame in a video sequence that has a background defining whether spatial areas in the image frame belong to a background or a foreground.

The present disclosure relates to method of background modelling for a video stream acquired by a camera having movement capabilities. FIG. 1. shows a flow chart of a method according to an embodiment of the presently disclosed method 100 of background modelling for a video stream acquired by a camera having movement capabilities. The method 100 comprises the steps of:

acquiring a video stream comprising a sequence of image frames (101);

repeatedly updating a background model for the video stream by analyzing changes in the sequence of image frames and categorizing image areas in the image frames which do not change over time as background (102);

detecting camera movement (103), and, optionally, stopping repeatedly updating the background model;

upon detecting a camera movement stop or the camera movement going below a movement threshold, performing a reset of the background model by:

acquiring one or more image frames;

applying an image segmentation and/or object detection algorithm on the one or more image frames to identify at least foreground objects (104);

categorizing areas outside the identified foreground objects as background (105);

after having performed the reset of the background model, returning to repeatedly updating the background model for the video stream by analyzing changes in the sequence of image frames and categorizing image areas in the image frames which do not change over time as background (106).

A 'background model' can generally be considered to be a term that a person skilled in the art would understand within the context of the present disclosure. 'Background model' shall, within the context of this disclosure, be construed as a data model that determines, for each spatial area in the video sequence, whether that spatial area belongs to a background or a foreground in the video sequence. The data model may store this information or process it in any suitable way. A 'background' may include any area of an image frame which image data is sufficiently similar, for example, with respect to pixel data, to a corresponding area in a previous image frame. As an example, it is possible to compare brightness and/or color intensity for pixels or groups of pixels between image frames in the video stream. Typically, the background is intended to correspond to areas in a monitored scene which are not particularly relevant from an image analysis perspective. Similarly, a 'foreground' may include any area of an image frame which image data is sufficiently dissimilar to a corresponding area in a previous image frame. Foreground objects are typically in motion. In a practical and simplified context, the foreground may correspond to monitored objects, such as people, cars, goods, etc. A 'spatial area' may, within the context of this disclosure, be construed as any number of pixels or subpixels in an image frame that may further be grouped according to, for example, a shape or belonging to an object.

The step of detecting camera movement may comprise detecting that the camera movement is greater than a predetermined limit. If there is only slow movement, the conventional background modelling may still work properly.

When camera movement, or camera movement greater than a predetermined limit, is detected, the step of repeatedly updating the background model may be paused. When the camera is under quick movement, it may stop maintaining the background model during the movement. One embodiment of the presently disclosed method of background modelling further comprises the step of, upon having detected camera movement, but before having detected a camera movement stop or the camera movement going below a movement threshold, making a background overlay visible for an image area covering the entire image frame and/or applying full masking and/or pixelation over an image area covering the entire image frame. In other words, in case of background overlay, one option is to make the whole overlay visible. In case of dynamic privacy masking, it is possible to switch to full screen masking. Once the camera movement has ended, the reset of the background model is performed and the process can return to repeatedly updating the background model for the video stream by analyzing changes in the sequence of image frames and categorizing image areas in the image frames which do not change over time as background.

The steps of repeatedly updating a background model; detecting camera movement; detecting camera movement stop or the camera movement going below a movement threshold; and performing a reset of the background model may be sequential.

Repeatedly Updating a Background Model for the Video Stream

The step of repeatedly updating a background model for the video stream by analyzing changes in the sequence of image frames and categorizing image areas in the image frames which do not change over time as background may comprise analyzing sub-areas of the sequence of image frames, wherein, if no significant change occurs between the image frames in a sub-area during a predetermined period of time, the sub-area is categorized as a background sub-area.

FIGS. 2 and 3 illustrate examples of how the conventional background modelling of the presently disclosed method can be done.

Figure 2B:
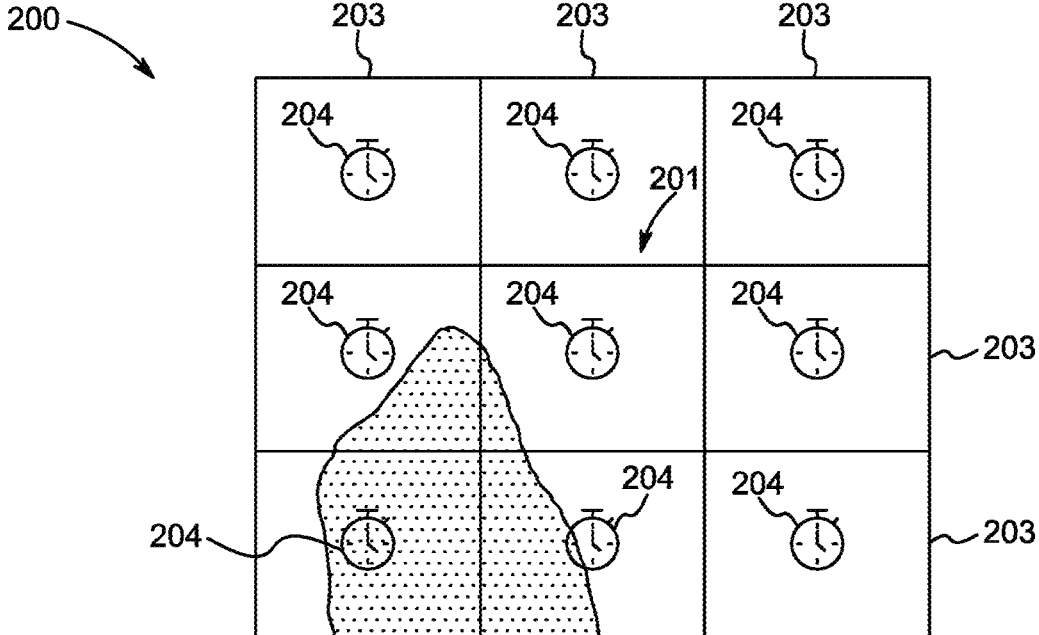

FIG. 2A illustrates an image frame 200 in a video sequence. The video sequence comprises a background model defining whether spatial areas in the image frame 200 belong to a background 201 or a foreground 202. In this embodiment, any significant change in the background 201 transitions the corresponding spatial area to the foreground 202. Spatial areas comprising image data that are substantially unchanged for a sufficiently prolonged time may be transitioned to the background The image frame 200 can, for example be divided into a number of spatial areas 203, where each spatial area 203 is evaluated to be either background or foreground depending on if there are changes in the spatial area. FIG. 2B illustrates the image frame 200 of FIG. 2A overlapped with a schematic illustration of an example of a first algorithm comprising a plurality of timers 204. Each timer 204 is associated with a spatial area 203 of a plurality of spatial areas 203 in the image frame 200. If no significant change has occurred in image data of a spatial area 203 of an image frame 200 relative image data of said spatial area 200 of a preceding image frame 200 before a predetermined time limit, said spatial area 203 is defined as an idle area 201 in the background model.

If significant change is detected in image data of a spatial area 203 of an image frame 200 relative image data of said spatial area 203 of a preceding image frame 200, a spatial area 203 of the background 201 may transition to foreground 202.

The timers 204, which represent one way of implementing the repeated updating of the background model, are beneficial in that they are simple and computationally efficient. It is easy to implement thresholds and/or to manipulate the result compared to similar algorithms. This is partly because timers 204 are numbers and numbers are simple. For example, by simply adding a number of seconds to a timer 204, the timer 204 will reach its threshold faster without needing to change the threshold. As another example, a timer 204 may be prevented from ever reaching its threshold by resetting it with a predictable periodicity.

The timers 204 may further count up and/or down without significant computational complexity. Upon determining that the idle area 201 is not to be transitioned, the timer 204 associated with that idle area 201 may be reset or paused, or the time limit of the timer 204 associated with that idle area 201 may be increased. Manipulating the timers 204 is a simple and efficient way to maintain the idle area 201 as a foreground area 202 in the background model. An idle area 201 may be indicated to be transitioned from foreground 202 to background 201 when a timer 204 of the algorithm associated with the idle area 201 reaches an indication threshold being lower than the predetermined time limit.

Figures 3A, 3B, 3C:
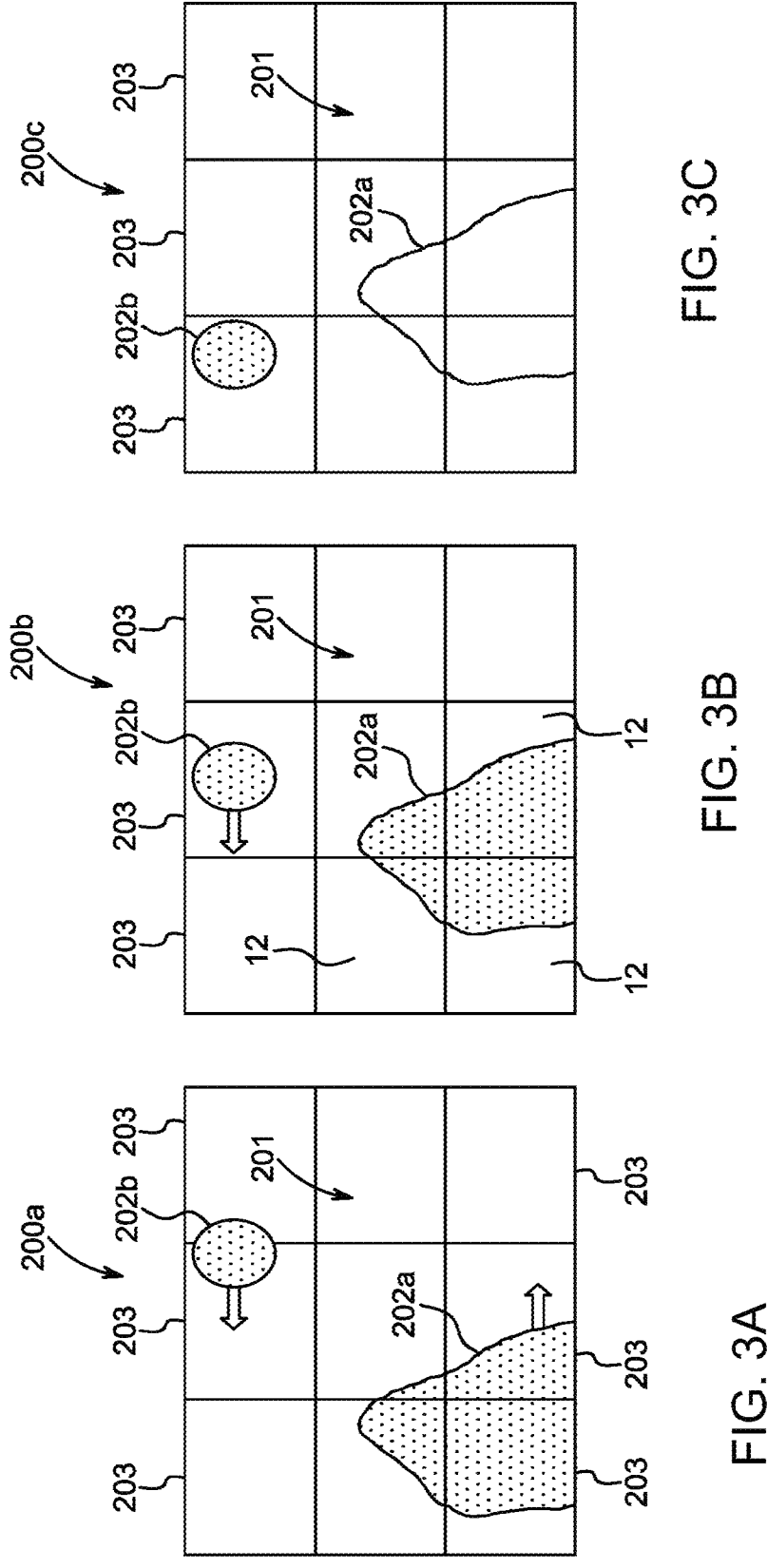
FIGS. 3A-3C is a schematic illustration of image frames in a video sequence of a foreground object transitioning to a background object.

FIGS. 3A-3C show an example of a foreground object transitioning to a background object. In this example the lower foreground object 202a becomes idle in the middle image frame 200b. Therefore, the spatial areas 203 comprising the object 202a become idle areas 201, whereas they were not in the leftmost image frame 200a when the object 202a was in motion. The idle areas 201 of the middle image frame 200b are indicated to be transitioned from the foreground to the background. In the rightmost image frame 200c, the object 202a has thus been transitioned to the background. The spatial areas 203 are depicted in the figures as being nine areas per image frame 200a-c. There may be substantially more or fewer than depicted. As an example, each pixel or each square of four pixels of the image frame 200a-b may be a spatial area 203.

As a person skilled in the art would understand the embodiment described in FIGS. 2-3 are not the only way of repeatedly updating a background model for the video stream by analyzing changes in the sequence of image frames and categorizing image areas in the image frames which do not change over time as background.

Resetting the Background Model

As described above, by using a quick reset of the background model when the camera stops moving, the background modelling can quickly generate a valid background and start further processing of the image frames, which may need the background model.

Preferably, the step of performing the reset of the background model is performed substantially immediately after the camera movement stop or the camera movement going below a movement threshold has been detected. There are several methods for determining camera movement and a degree of how much camera movement there is, which would be readily available to the person skilled in the art. A straightforward way is to use the control signal(s) that controls the movement of the camera for this purpose, but it is also possible to use, for example, measured physical data from the camera or by analyzing the captured images, for example by studying how reference points in the images move.

The conventional repeated step of updating a background model is typically a continuous process. As explained in the previous section, in this process changes in the sequence of image frames are analyzed over time. In contrast, the step of resetting the background model may be a, preferably quick, single event. The step of applying an image segmentation and/or object detection algorithm, preferably, does not involve analysis of changes over time but is performed for a limited number of images, possibly even on a single image. When the camera movement stops it may be useful to generate a quick first background model rather than using the conventional background modelling, which will typically require some time to produce a background model. It can be noted that a short power peak may be acceptable at this point since the movement, which otherwise can use significant power, has stopped, or is at least relatively low. Once the quick reset of the background model has been done the process can return to the process of repeatedly updating the background model for the video stream by analyzing changes in the sequence of image frames and categorizing image areas in the image frames which do not change over time as background.

An image segmentation may be, for example, an object segmentation, instance segmentation, semantic segmentation or a panoptic segmentation. All of these examples of image segmentations do not include analysis of motion over time, i.e. changes between several image frames to categorize image areas in the image frames which do not change over time as background. They can therefore be applied instantly on one, or a limited number of, image frames. The advantage of resetting the background model described in the present disclosure can be illustrated by the following example. A frame rate of a camera may be, for example, 30 frames per second (fps), 50 fps, 60 fps or 120 fps. The conventional algorithm for updating a background model by analyzing changes in the sequence of image frames and categorizing image areas in the image frames which do not change over time as background may take, for example 2 seconds. In other words, upon a camera movement stop or the camera movement going below a movement threshold, it may take a few seconds until the conventional background modelling can produce a background model as intended. The background model reset described in the present disclosure may be performed significantly faster, such as in less than 300 milliseconds, preferably in less than 200 milliseconds, even more preferably in less than 100 milliseconds. The image segmentation and/or object detection algorithm can therefore be applied on a single image frame, which will provide a background model significantly faster than the conventional background modelling can produce a background model. The image segmentation and/or object detection algorithm can be applied on additional image frames, such as less than 3 image frames, less than 5 image frames or less than 8 image frames. In principle the image segmentation and/or object detection algorithm can be used repeatedly until the conventional background modelling is ready to produce a background model. In one embodiment of the presently disclosed method of background modelling for a video stream acquired by a camera having movement capabilities, the step of applying an image segmentation on the one or more image frames to identify at least foreground objects comprises image segmentation performed on a single image frame, or on a number of independent image frames without analyzing motion to identify foreground and background.

The term 'object detection' in the context of the present disclosure refers to detecting one or more objects in an image and return their positions, usually in the form of coordinates. In some of the most common object detection applications, bounding boxes indicate the detected objects.

In the present disclosure an image segmentation and/or object detection algorithm is applied on the one or more image frames to identify at least foreground objects. The method can be trained to know which type of objects will typically be foreground objects. This may typically be objects that are known to be capable of moving in a video stream, for example, people, vehicles, animals etc. The method may additionally have knowledge about which objects are to be regarded as background. This may typically be objects that are known to be still in a video stream, for example, buildings.

The step of identifying at least foreground objects by an image segmentation and/or object detection algorithm may comprise applying a machine learning model, such as a neural network, trained to recognize objects, such as the abovementioned objects. The neural network may comprise, for example, a deep learning model. There are a number of neural network algorithms/technologies that may be used for detecting objects, for example, Convolutional Neural Networks (CNN), Recurrent Neural Networks (RNN), etc. Generally, a person skilled in the art would be in the position to carry out such an object detection by means of neural network.

According to a non-limiting example of a setup for object detection using a neural network, a neural network is fed with labelled data. The labelled data is, for example, an image of an object, wherein the image is labelled with the correct type of object, i.e. the labelled data includes a ground truth of the image data and the image data itself. The image data is inputted to a classifier and the ground truth is sent to a loss function calculator. A classifier processes the data representing an object to be classified and generates a classification identifier. The processing in the classifier may include applying weights to values as the data is fed through the classifier. The classification identifier may be a feature vector, a classification vector, or a single value identifying a class. In the loss function the classification identifier is compared to the ground truth using, for example, a loss function. The result from the loss function is then transferred to a weight adjustment function that is configured to adjust the weights used in the classifier. A process may then scan images by using the neural network to detect and classify objects in the images.

Figure 6:
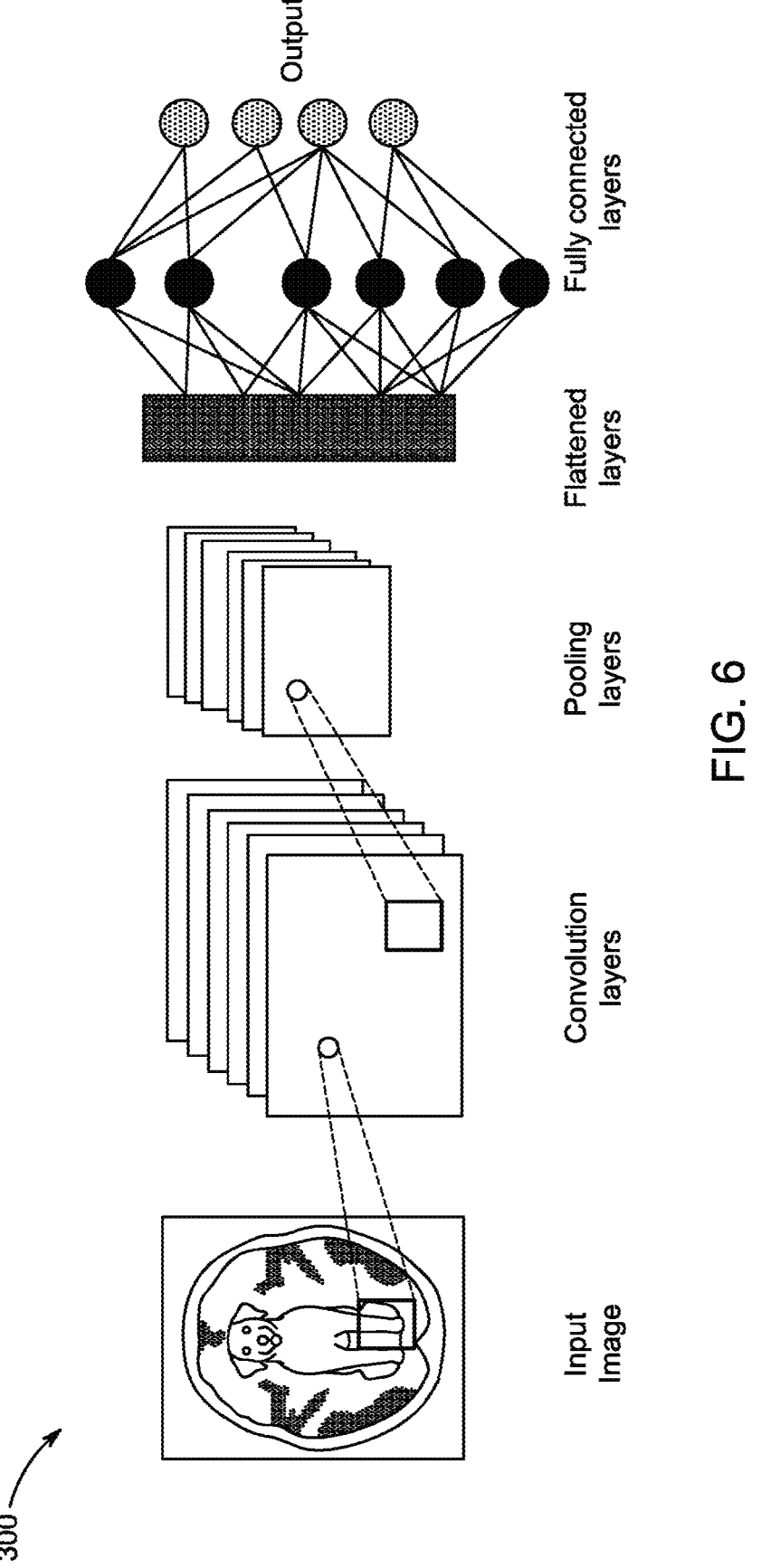
FIG. 6 shows an example of a conceptual framework for object detection using a neural network.

FIG. 6 shows an example of a conceptual framework 300 for object detection using a neural network. Some building blocks of CNNs are convolution layers, pooling layers, flattened layers, and fully connected layers. An input of a CNN is a tensor. Convolutional layers convolve the input and pass its result to the next layer. This is similar to the response of a neuron in the visual cortex to a specific stimulus. Convolutional networks may further include pooling layers. The pooling layers reduce the dimensions of data by combining the outputs of neuron clusters at one layer into a single neuron in the next layer. A CNN may further comprise fully connected layers which connect every neuron in one layer to every neuron in another layer. A flattened matrix may thereby go through a fully connected layer to classify the images.

There are other object detection algorithms that do not rely on CNN or machine learning.

In one embodiment of the presently disclosed method of background modelling for a video stream acquired by a camera having movement capabilities the image segmentation and/or object detection algorithm on the one or more image frames to identify foreground objects comprises thresholding and/or clustering and/or histogram-based segmentation and/or edge detection.

One example of an object detection algorithm is the Viola-Jones detection framework. In this method the image frames are scanned with a sliding window, where each region is classified as containing or not containing an object. The method uses Haar features and a cascaded classifier to detect objects. There are various types of such object detection methods known in the art where cascades of identifiers are used to detect objects, e.g. as described in Viola, Paul, and Michael Jones. "Rapid object detection using a boosted cascade of simple features." Computer Vision and Pattern Recognition, 2001. CVPR 2001. Proceedings of the 2001 IEEE Computer Society Conference on. Vol. 1. IEEE, 2001. Since it is the visual features that are important for these algorithms groups of objects that share similar visual features may be detected, examples of such groups of features are faces, vehicles, humans etc. Any of these methods may be used separately or in combination to detect an object in image data. Several objects may also be detected in the same set of image data. When an object has been detected, a set of identification characteristics may be created to describe the visual appearance of the detected object.

Figure 5:
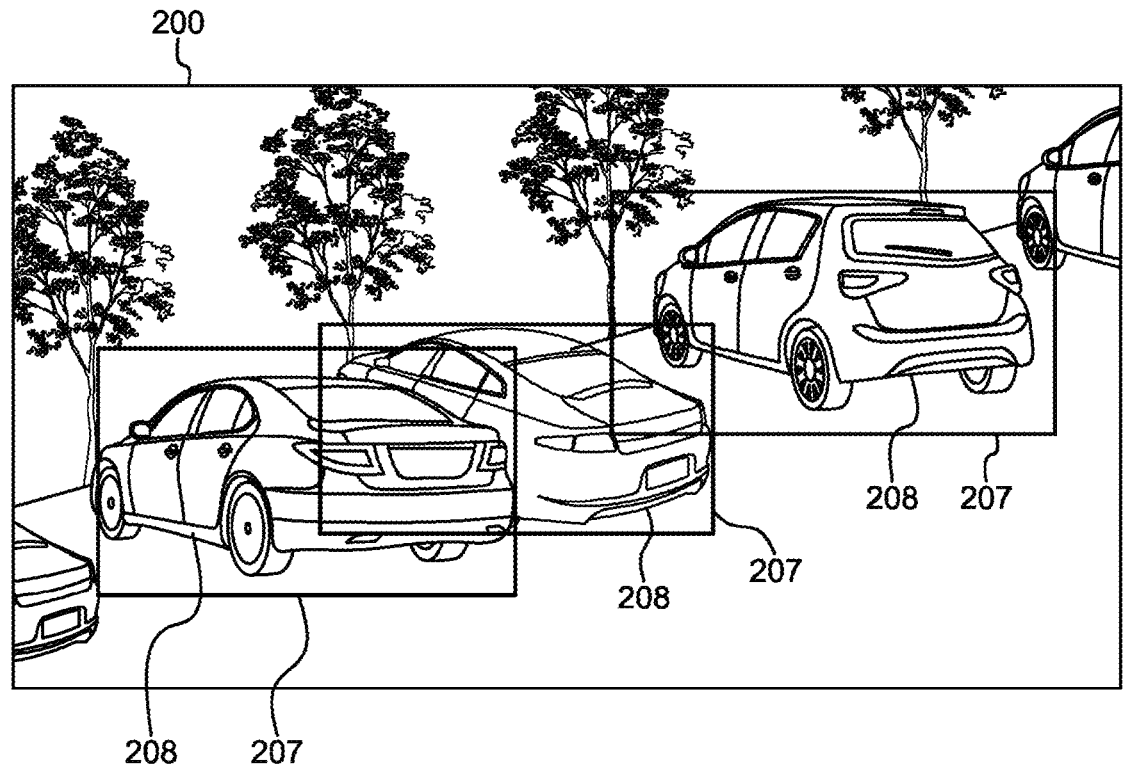
FIG. 5 shows an image frame in which a number of objects have been detected and wherein bounding boxes have been added.

FIG. 5 shows an example of an image frame 200 in which a number of objects 208 have been detected and wherein bounding boxes 207 have been added. In the example of FIG. 5 the objects 208 are cars, but the object may be any item that would be considered to belong to a foreground or a background.

Figure 4A:
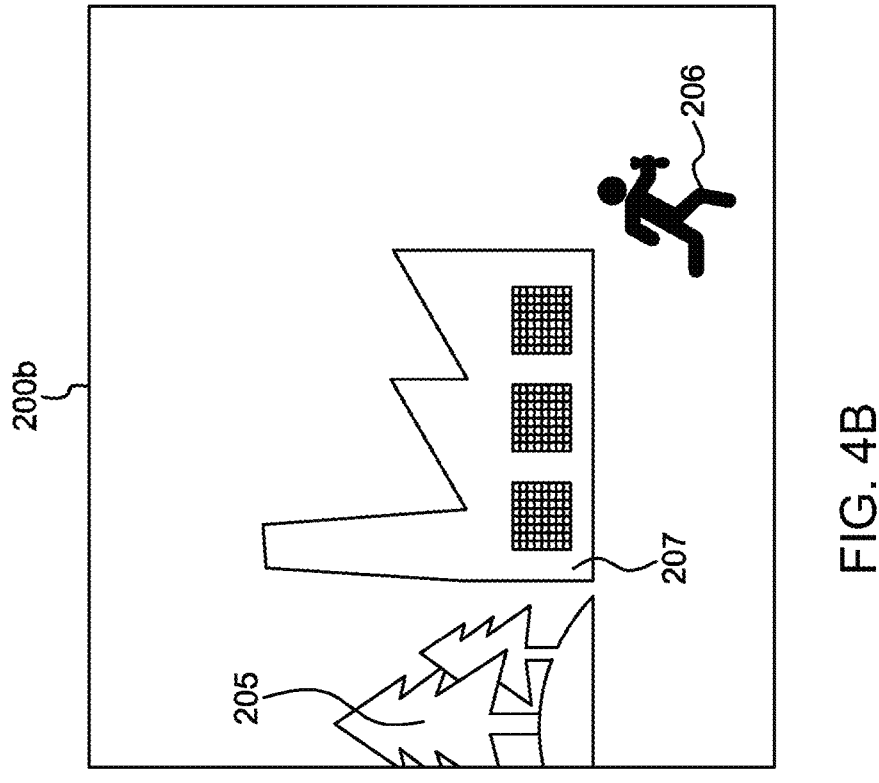
FIGS. 4A-4B shows an example of image frames in a video sequence with camera movement.
Figure 4B:
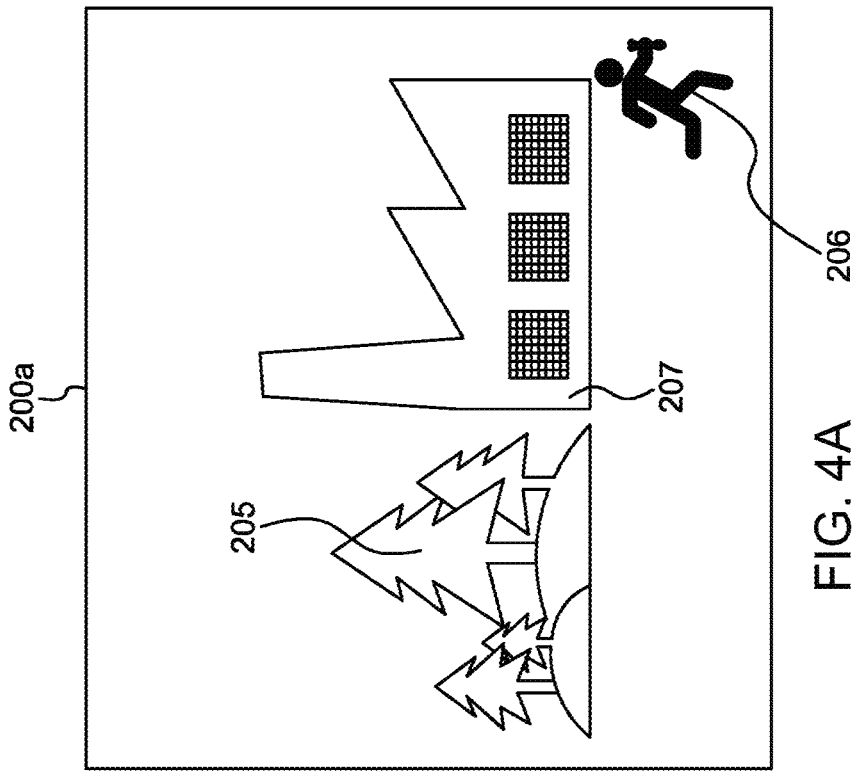

FIGS. 4A-4B show an example of image frames 200a/200b in a video sequence with camera movement. In this example of camera movement, it can be seen that there is camera panning between the left and right image frames. The fixed background objects (trees 205 and building 207) do not have the same positions in the two image frames 200a and 200b. At the same time there is a moving object 206, which has different positions relative to the background objects 205 and 207 in the two image frames 200a and 200b.

Figure 7:
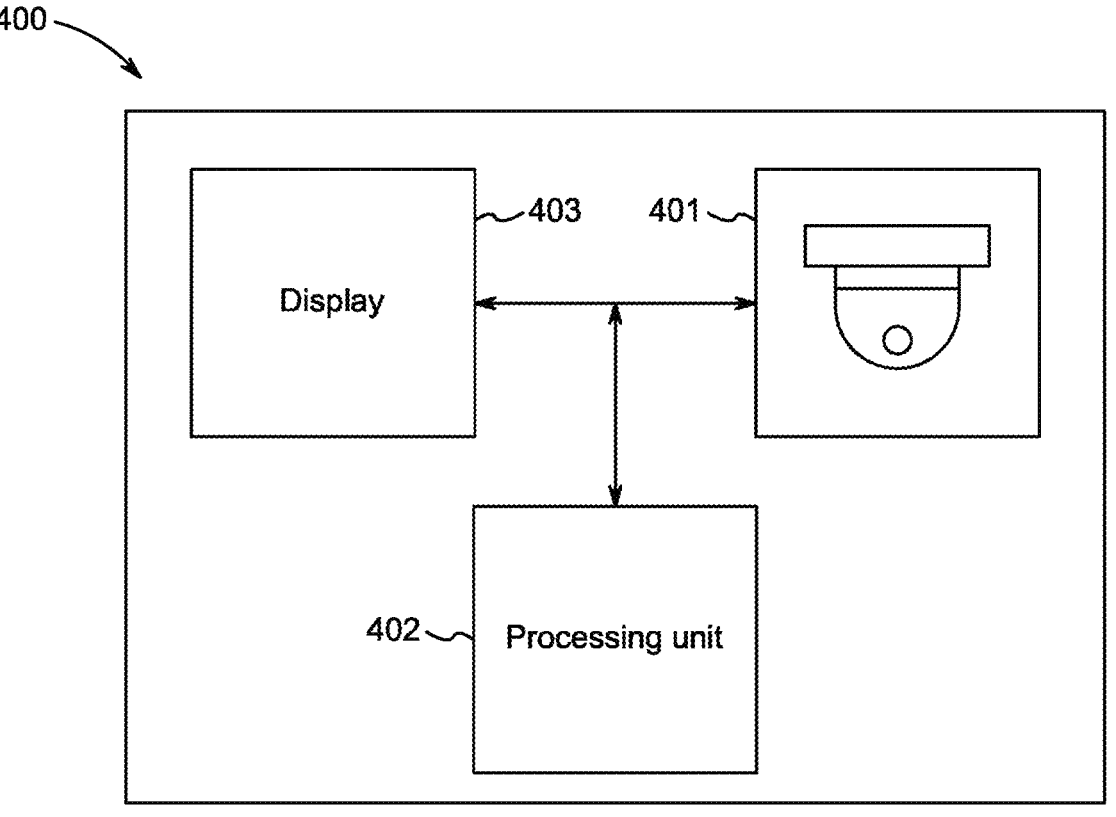
FIG. 7 shows a schematic view of an embodiment of the presently disclosed image processing system.

FIG. 7 shows a schematic view of an embodiment of the presently disclosed image processing system 400. The disclosed image processing system 400 comprises a camera 401, a display 403, and a processing unit 402.

The system may, but does not necessarily have to, include a display for displaying the sequence of image frames. The background modelling may be useful in a number of applications that are visualized on a display, including overlay and dynamic masking applications. However, in further applications the background model is not necessarily displayed but used in additional applications. The additional application may include, for example, extracting statistics or further analysis of the video.

The system may further comprise peripheral components, such as one or more memories, which may be used for storing instructions that can be executed by the processing unit. The system may further comprise any of: internal and external network interfaces, input and/or output ports, a keyboard or mouse etc.

As would be understood by a person skilled in the art, a processing unit also may be a single processor in a multi-core/multiprocessor system. Both the computing hardware accelerator and the central processing unit may be connected to a data communication infrastructure.

The system may include a memory, such as a random access memory (RAM) and/or a read-only memory (ROM), or any suitable type of memory. The system may further comprise a communication interface that allows software and/or data to be transferred between the system and external devices. Software and/or data transferred via the communications interface may be in any suitable form of electric, optical or RF signals. The communications interface may comprise, for example, a cable or a wireless interface.

The present disclosure further relates to a computer program having instructions which, when executed by a computing device or computing system, cause the computing device or computing system to carry out any embodiment of the presently disclosed method of background modelling for a video stream. The computer program may be stored on any suitable type of storage media, such as non-transitory storage media.

What is claimed is:

1. A computer-implemented method of background modelling for a video stream acquired by a camera having movement capabilities, the method comprising:
   acquiring a video stream comprising a sequence of image frames;
   repeatedly updating a background model for the video stream by analyzing changes in the sequence of image frames and categorizing image areas in the image frames which do not change over time as background;
   detecting camera movement, and stopping repeatedly updating the background model;
   upon detecting a camera movement stop or the camera movement going below a movement threshold, performing a reset of the background model by:
      acquiring an image frame;
      applying an image segmentation or object detection algorithm on the image frame to identify at least foreground objects, wherein the image segmentation or object detection algorithm is trained to recognize objects that are known to be capable of moving in a video stream without analyzing changes between image frames over time; and
      categorizing areas outside the identified foreground objects as background; and
   after having performed the reset of the background model, returning to repeatedly updating the background model for the video stream by analyzing changes in the sequence of image frames and categorizing image areas in the image frames which do not change over time as background.

2. The method of background modelling for a video stream according to claim 1, wherein the step of performing the reset of the background model is performed substantially immediately after the camera movement stop or the camera movement going below a movement threshold has been detected.

3. The method of background modelling for a video stream according to claim 1, wherein the camera movement comprises panning or tilting or zooming.

4. The method of background modelling for a video stream according to claim 1, further comprising the step of performing background overlaying or masking based on the background model.

5. The method of background modelling for a video stream according to claim 1, further comprising the step of, upon having detected camera movement, but before having detected a camera movement stop or the camera movement going below a movement threshold, making a background overlay visible for an image area covering the entire image frame or applying full masking or pixelation over an image area covering the entire image frame.

6. The method of background modelling for a video stream according to claim 1, wherein the step of repeatedly updating a background model is a continuous process, and wherein the reset of the background model is a single event.

7. The method of background modelling for a video stream according to claim 1, wherein the step of repeatedly updating a background model comprises analyzing sub-areas of the sequence of image frames, wherein, if no significant change occurs between the image frames in a sub-area during a predetermined period of time, the sub-area is categorized as a background sub-area.

8. The method of background modelling for a video stream according to claim 1, wherein the step of applying an image segmentation or object detection algorithm on the one or more image frames to identify foreground objects comprises thresholding or clustering or histogram-based segmentation or edge detection.

9. The method of background modelling for a video stream according to claim 1, wherein the steps of repeatedly updating a background model; detecting camera movement; detecting camera movement stop or the camera movement going below a movement threshold; and performing a reset of the background model are sequential.

10. The method of background modelling for a video stream according to claim 1, further comprising displaying the sequence of image frames on a display.

11. A non-transitory storage media comprising a computer program having instructions which, when executed by a computing device or computing system, cause the computing device or computing system to carry out the method of background modelling for a video stream according to claim 1.

12. An image processing system comprising:
at least one camera, such as a pan-tilt-zoom camera; and
a processing unit configured to:
acquire a video stream comprising a sequence of image frames;
repeatedly update a background model for the video stream by analyzing changes in the sequence of image frames and categorizing image areas in the image frames which do not change over time as background;
detect camera movement, and stop repeatedly updating the background model;
upon detecting a camera movement stop or the camera movement going below a movement threshold, perform a reset of the background model by:
acquiring an image frame;
applying an image segmentation or object detection algorithm on the image frame to identify foreground objects, wherein the image segmentation or object detection algorithm is trained to recognize objects that are known to be capable of moving in a video stream without analyzing changes between image frames over time; and
categorizing areas outside the identified foreground objects as background; and
after having performed the reset of the background model, return to repeatedly updating the background model for the video stream by analyzing changes in the sequence of image frames and categorizing image areas in the image frames which do not change over time as background.

* * * * *